United States Patent
Fu et al.

(10) Patent No.: US 9,056,971 B2
(45) Date of Patent: Jun. 16, 2015

(54) RUBBER-PLASTIC ALLOY FOR WARM MIX ASPHALT MIXTURE AND METHOD FOR MANUFACTURING THE SAME

(75) Inventors: Yi Fu, Dongguan (CN); Huaiyu Zheng, Dongguan (CN); Songbin Tan, Dongguan (CN)

(73) Assignee: GUANGDONG SILVER AGE SCI & TECH CO., LTD., Dongguan, Guangdong Province (CN)

( * ) Notice: Subject to any disclaimer, the term of this patent is extended or adjusted under 35 U.S.C. 154(b) by 609 days.

(21) Appl. No.: 13/214,311

(22) Filed: Aug. 22, 2011

(65) Prior Publication Data

US 2012/0136107 A1 May 31, 2012

(30) Foreign Application Priority Data

Nov. 29, 2010 (CN) .......................... 2010 1 0562411

(51) Int. Cl.
| | | |
|---|---|---|
| C08K 5/01 | (2006.01) | |
| C08L 23/04 | (2006.01) | |
| C04B 18/02 | (2006.01) | |
| C04B 26/26 | (2006.01) | |
| C04B 40/00 | (2006.01) | |
| C08L 23/06 | (2006.01) | |
| C08L 19/00 | (2006.01) | |
| B29B 9/06 | (2006.01) | |
| C04B 111/00 | (2006.01) | |
| B29C 47/00 | (2006.01) | |

(52) U.S. Cl.
CPC ............... *C08L 23/04* (2013.01); *C04B 18/022* (2013.01); *C04B 26/26* (2013.01); *C04B 40/0039* (2013.01); *C04B 2111/0075* (2013.01); *C08K 5/01* (2013.01); *C08L 23/06* (2013.01); *C08L 19/003* (2013.01); *B29B 9/06* (2013.01); *B29C 47/0004* (2013.01); *B29C 47/0011* (2013.01); *B29C 47/0066* (2013.01); *B29C 2947/92* (2013.01); *B29C 2947/92704* (2013.01)

(58) Field of Classification Search
USPC .................................. 524/477, 487, 515, 525
See application file for complete search history.

(56) References Cited

U.S. PATENT DOCUMENTS

| | | | | |
|---|---|---|---|---|
| 2010/0199885 A1* | 8/2010 | Naidoo et al. | ........... | 106/204.01 |
| 2010/0319577 A1* | 12/2010 | Naidoo et al. | ................ | 106/235 |
| 2011/0196073 A1* | 8/2011 | Fee et al. | ........................ | 524/68 |
| 2012/0022182 A1* | 1/2012 | Ranka | ........................... | 523/351 |
| 2012/0167802 A1* | 7/2012 | Huh | .............................. | 106/669 |
| 2012/0225979 A1* | 9/2012 | Naidoo et al. | ................ | 524/64 |
| 2013/0186302 A1* | 7/2013 | Naidoo et al. | ........... | 106/123.13 |
| 2013/0239850 A1* | 9/2013 | Naidoo et al. | ................ | 106/230 |

* cited by examiner

*Primary Examiner* — Wenwen Cai

(74) *Attorney, Agent, or Firm* — Jackson IPG PLLC; Demain K. Jackson

(57) ABSTRACT

A rubber-plastic alloy for a warm mix asphalt mixture and a method for manufacturing the same are disclosed. The rubber-plastic alloy consists of plastic, crumb rubber, cracked wax and rubber oil. The manufacturing method includes extruding the plastic, the crumb rubber, the cracked wax, and the rubber oil at suitable ratio via a single screw extruder, and pelleting via a water-cooled die-face cutter. The rubber-plastic alloy is mixed with a hot mineral material in an asphalt mixture mixer, and then liquid asphalt matrix is pumped into the mixer via an asphalt pump to provide a warm mix rubber-plastic modified asphalt mixture. The rubber-plastic alloy is applied for modifying an asphalt mixture to an effect equivalent to that achieved by a wet method.

3 Claims, No Drawings

RUBBER-PLASTIC ALLOY FOR WARM MIX ASPHALT MIXTURE AND METHOD FOR MANUFACTURING THE SAME

FIELD OF THE INVENTION

The present invention relates to the technical field of rubber-plastic alloy, and, in particular, to a rubber-plastic alloy for a warm mix asphalt mixture, and a method for manufacturing the same.

BACKGROUND OF THE INVENTION

Plastic (for example, polyethylene) modified asphalt can significantly improve the rutting resistance and high-temperature resistance of an asphalt pavement, while a crumb rubber modified asphalt can greatly improve the cracking resistance of the asphalt pavement. An alloy prepared by combining the plastic-modified asphalt and the crumb rubber modified asphalt can improve the rutting resistance and the cracking resistance of the pavements. At present, the plastic and the crumb rubber are substantially applied to an asphalt pavement by wet and dry methods. The wet method comprises mixing the plastic and the crumb rubber with the warm asphalt at high temperature to provide a rubber-plastic modified asphalt, which is then mixed with an aggregate. The dry method comprises mixing the plastic or the crumb rubber as a modifier with other stone material in a mixing pot to prepare a mixture.

In the process of the wet method, the rubber-plastic material can be sufficiently reacted with the asphalt at high temperature to become a part of the asphalt cementing material and increase the viscosity of the asphalt matrix, which can then serve as a binder in the mixture. However, the wet method suffers from the disadvantages of complicated process, time consuming, high energy consumption, high smoke pollution and expensive cost and equipments, as well as strictly controlled shearing and agitating time so as to avoid excessive degradation. In the modified asphalt obtained by a wet method, the viscosity of the matrix asphalt and the asphalt/stone ratio in the mixture will be correspondingly increased. Furthermore, for the purpose of obtaining a rubber-plastic modified asphalt having stable performance, the type of the crumb rubber should be selected, for example, a crumb rubber from a jumbo tyre containing high amount of natural rubber (comprising more than 60% of the rubber used a tyre) are usually used. This hinders the development of the wet method, and in turn the application thereof. Existing dry methods have the advantages of low pollution and easy application, however, the mixture prepared by the same cannot increase the viscosity of the asphalt matrix, and thus can not significantly improve the rutting, high temperature and cracking resistance of the pavements.

A warm mix asphalt (about 140° C.) has the advantages of being able to be processed and spreaded at a temperature lower than conventional hot mix asphalt (about 170° C.), and thus arouse wide attention by greatly reduce energy consumption and pollution.

A warm mixing method is urgently needed for solving the problem caused by the high temperature for processing a rubber-plastic asphalt, so that the defects of complicated process, time consuming, high energy consumption, and high smoke pollution existing in the wet process of the prior art can be overcome, and the temperature for hot mixing the asphalt can be reduced, while combining the modifying effect of a wet method and the advantages of low pollution and easy application of a dry method. Therefore, there is an urgent need for a rubber-plastic alloy having high fluidity.

SUMMARY OF THE INVENTION

An object of the present invention is to provide a rubber-plastic alloy for mixing an asphalt mixture and the method for preparing the same. The rubber-plastic alloy can be prepared by utilizing conventional recycled plastic and recovered tyre rubber from small-size vehicles, and significantly improve the rutting, high temperature, and cracking resistance of asphalt pavements during road construction. The preparing method according to the present invention has the advantages of simple and easy process, low pollution, wide source of raw materials, and continuous production. The crumb rubber in the warm mix rubber-plastic alloy has the advantages of uniform distribution, significantly reduced particle size, rapid diffuse at low temperature, and direct use in producing a mixture.

The technical solution for achieving the present invention comprises: a rubber-plastic alloy for a warm mix asphalt mixture, which is consisted of 5-30 wt % polyethylene plastic, 70-95 wt % crumb rubber, cracked wax, and rubber oil, in which the summed amount of the cracked wax and the rubber oil is 10-50% of the summed amount of the polyethylene plastic and the crumb rubber, the weight ratio of the cracked wax and the rubber oil is 3:1. The method for preparing the above rubber-plastic alloy comprises: sequentially adding recovered plastic, crumb rubber, cracked wax, and rubber oil at suitable ratio into a single screw extruder, mixing at high temperature, extruding, and pelleting via a water-cooled die-face cutter to provide particles. The use of the rubber-plastic alloy lies in that the particles thereof are dry mixed with a hot mineral material in an asphalt mixture mixing equipment for 5-30 s, where the hot mineral material is a mixture of coarse aggregate, fine aggregate, and mineral fine, etc., for road paving.

In the above rubber-plastic alloy, the polyethylene plastic is recovered polyethylene plastic, including LDPE (low density polyethylene) plastic and HDPE (high density polyethylene) plastic.

The above crumb rubber is a crumb rubber prepared from wasted tyres, which contain high synthetic rubber content and are obtained from small-size vehicles. The crumb rubber has a particle size of 10-60 mesh, and complies with GB/T19208-2008 for Vulcanized Rubber Crumb Rubber in technical specifications.

The cracked wax as an additive is a wax obtained by cracking cross-linked polyethylene cable material at 400-480° C., having a melting point of 100-110° C. The rubber oil is conventional aromatic oil in rubber industry. Recovered plastic, crumb rubber, cracked wax, and rubber oil were sequentially added to a single screw extruder at suitable ratio, thoroughly mixed, extruded, and pelleted via a water-cooled die-face cutter to provide particles having a size smaller than 4 mm and a melt index higher than 3.0 g/10 min (190° C., 2.16 kg). The temperature at the mixing section is 150-260° C., and the die temperature is 70-120° C. Particles were formed by a water-cooled die-face cutter. When using, the obtained particles of rubber-plastic alloy were put into an asphalt mixture mixer and mixed with a hot mineral material (140-160° C.) for 5-30 s, into which liquid asphalt matrix was pumped via an asphalt pump. Mixing was performed for another 20-90 s to provide a composite modified asphalt mixture.

The present is mainly based on the following principle: part of the cross-linked network of the crumb rubber are destroyed by high temperature shearing, and separated by the plastic, so that the crumb rubber is further refined, and the cracked wax and the rubber oil are further fused, thereby facilitating the mixing of crumb rubber, improving the dispersity of the warm mix rubber-plastic alloy, and enabling rapid diffusion at low temperature.

In comparison with the prior art, the present invention has the following advantages:

1) the warm mix rubber-plastic alloy produced by the present invention is a mixture of crumb rubber, plastic, cracked wax and rubber oil. By the strong shearing exerted during mixing and extruding, the initial crumb rubber is decreased in particle size, loosened in structure, and pre-swelled due to the cracked wax and rubber oil. Therefore, the time for reaching ideal modification for the crumb rubber when being mixed in the mixture is significantly reduced, and the obtained crumb rubber can be used in a dry method.

2) the wasted plastic, the cracked wax, and the rubber oil are involved in preparing a warm mix rubber-plastic alloy, and the warm mix rubber-plastic alloy thus obtained has a density similar to that of the asphalt matrix, so as to decrease separation and improve stability during use.

3) the raw materials (except for the rubber oil) used in the present invention are all wasted polymer material, which are turned to useful products in large amount, and provide a mixture having excellent performance.

4) the warm mix rubber-plastic alloy prepared according to the present invention has a similar modification effect and the advantage of simple process, low equipment cost, continuous production, convenient transportation, stable storage, and easy application over the rubber asphalt prepared by a wet method. It has excellent economical and social benefits in road paving.

The present invention is further explained below in combination with particular embodiments.

DETAILED DESCRIPTION

Example 1

2 kg recovered low density polyethylene, 7 kg 60-mesh crumb rubber recovered from tyres for small-size vehicle, 3 kg cracked wax, and 1 kg rubber oil were sequentially added into a single-screw extruder, mixed at a fusion temperature of 180° C., extruded at a die temperature of 70° C., and pelleted via a water-cooled die-face cutter to provide #1 warm mix rubber-plastic alloy. The particles of the obtained warm mix rubber-plastic alloy were then placed and dry mixed in a mixer having hot mineral material of 140° C.~150° C. for 15 s, in which an asphalt matrix was added and mixed for 20 s to provide a warm mix rubber-plastic modified asphalt mixture.

Example 2

2 kg recovered high density polyethylene, 8 kg 10-mesh crumb rubber recovered from tyres for small-size vehicle, 3 kg cracked wax, and 1 kg rubber oil were sequentially added into a single-screw extruder, mixed at a fusion temperature of 260° C., extruded at a die temperature of 120° C., and pelleted via a water-cooled die-face cutter to provide #2 warm mix rubber-plastic alloy. The particles of the obtained warm mix rubber-plastic alloy were then placed and dry mixed in a mixer having hot mineral material of 150° C.~160° C. for 30 s, in which an asphalt matrix was added and mixed for 80 s to provide a warm mix rubber-plastic modified asphalt mixture.

Example 3

1 kg mixture of recovered high and low density polyethylene at any ratio, 9 kg 60-mesh crumb rubber recovered from tyres for small-size vehicle, 3 kg cracked wax, and 1 kg rubber oil were sequentially added into a single-screw extruder, mixed at a fusion temperature of 230° C., extruded at a die temperature of 100° C., and pelleted via a water-cooled die-face cutter to provide #3 warm mix rubber-plastic alloy. The particles of the obtained warm mix rubber-plastic alloy were then placed and dry mixed in a mixer having hot mineral material of 140° C.~150° C. for 20 s, in which an asphalt matrix was added and mixed for 50 s to provide a warm mix rubber-plastic modified asphalt mixture.

1) Comparison of the Performance Between the Prepared Warm Mix Rubber-Plastic Alloys The warm mix rubber-plastic alloys were injected into standard mechanical property sample bar, and tested. The result was shown in table 1 below. The melt index was obtained by Standard Testing Method ASTM D1238 for Flowing Speed of Thermoplastic Melt.

TABLE 1

Flowing property of warm mix rubber-plastic alloy

| Sample No. | Melt index (190° C., 2.16 kg) g/10 min |
|---|---|
| 1 | 6.2 |
| 2 | 3.4 |
| 3 | 4.6 |

2) Comparison of the Performance of the Mixtures

The conventional Marshall Performance, high temperature stability, and cracking performance at low temperature of the #1, 2 and 3 warm mix rubber-plastic alloy were compared with those of #70 Zhenhai asphalt, and the results were listed in tables 2-4 below.

The definition of testing items and testing process were carried out under Technical Specifications JTG F40-2004 for Paving Highway Asphalt Pavements.

TABLE 2 testing items for Marshall testing

| Testing Items | unit | Kinds of Asphalt | | | | Technical specification |
|---|---|---|---|---|---|---|
| | | 70# Zhenhai | 1 | 2 | 3 | |
| Asphalt/stone ratio | % | 4.6 | 4.6 | 4.6 | 4.6 | |
| Void ratio | % | 4.0 | 4.1 | 8.3 | 4.3 | 3~6 |
| voids in mineral aggregate | % | 14.6 | 14.9 | 18.5 | 14.1 | ≥12 |
| Asphalt interstitial rate | % | 72.5 | 70.4 | 56.6 | 73.2 | 65~75 |
| stability | kN | 11.3 | 13.4 | 8.4 | 10.7 | ≥7.5 |
| Flow value | 0.1 mm | 3.46 | 3.23 | 5.46 | 2.61 | 15~40 |

TABLE 3 testing items for water stability

| Testing Items | unit | Kinds of Asphalt | | | | Technical specifications |
|---|---|---|---|---|---|---|
| | | 70# Zhenhai | 1 | 2 | 3 | |
| Residual stability | % | 80.1 | 83.6 | 100.0 | 83.5 | ≥80, ≥85 |
| Splitting strength under standard condition | MPa | 1.21 | 1.14 | 0.79 | 1.13 | — |
| Splitting strength when being immersed in water | MPa | 0.92 | 0.95 | 0.75 | 0.94 | — |
| TSR | % | 75.5 | 82.9 | 95.0 | 82.8 | ≥75, ≥80 |

TABLE 4

| | | Kinds of Asphalt | | | |
|---|---|---|---|---|---|
| Testing Items | unit | 70# Zhenhai | 1 | 2 | 3 |
| Dynamic stability | times/mm | 1127 | 5172 | 2536 | 4673 |

What is claimed is:

1. A rubber-plastic alloy for a warm mix asphalt mixture, wherein the rubber-plastic alloy consisting of polyethylene plastic, crumb rubber, cracked wax and rubber oil, the polyethylene plastic is present in an amount of 5-30 wt % based on the summed amount of the polyethylene plastic and the crumb rubber, the crumb rubber is present in an amount of 70-95 wt % based on the summed amount of the polyethylene plastic and the crumb rubber, the summed amount of the cracked wax and the rubber oil is 10-50 wt % of the summed amount of the polyethylene plastic and the crumb rubber, cracked wax, and rubber oil, in which the summed amount of the cracked wax and the rubber oil is 10-50% of the summed amount of the polyethylene plastic and the crumb rubber, the weight ratio of the cracked wax and the rubber oil is 3:1, and the rubber-plastic alloy can be directly used in an asphalt mixture and warmly mixed to provide a modified asphalt mixture.

2. The rubber-plastic alloy for a warm mix asphalt mixture according to claim 1, wherein the polyethylene plastic is recovered low density polyethylene, high density polyethylene, or a mixture of high and low density polyethylene mixed at any ratio.

3. The rubber-plastic alloy for a warm mix asphalt mixture according to claim 1, wherein the cracked wax is a wax formed by cracking a cross-linked polyethylene cable material at 400-480° C., having a melting point of 100-110° C.; and the rubber oil is aromatic oil conventionally used in rubber industry.

* * * * *